July 8, 1969

R. DUBOIS 3,454,746

ELECTRIC HEATING COVERING

Filed Dec. 22, 1966

United States Patent Office 3,454,746
Patented July 8, 1969

3,454,746
ELECTRIC HEATING COVERING
Robert Dubois, Chexbres-Vaud, Switzerland, assignor to Colfico, SA, Sion, Switzerland
Filed Dec. 22, 1966, Ser. No. 603,922
Claims priority, application Switzerland, Jan. 21, 1966, 831/66
Int. Cl. H05b 3/48
U.S. Cl. 219—549        3 Claims

ABSTRACT OF THE DISCLOSURE

This disclosure concerns a heating surface for walls, roadways and the like composed of beds of synthetic resin hardened by polymerization, with at least one electrical heating element disposed in the interior of the resin and at least one metallic structure disposed in the interior of the resin substantially parallel to the heating element, the metallic structure being electrically insulated from the element and electrically connected to the ground.

---

This invention relates to a heating covering and to a process for making the heating covering.

More particularly the invention is concerned with the general type of heating covering disclosed in U.S. patent application No. 438,726, filed Mar. 10, 1965. In that specification the heating covering comprises a mass of synthetic resin, hardened by polymerization or cross-linking (polyaddition), having at least one element of an electric heater disposed in its interior.

It is an object of the present invention to provide an improved heating covering over that previously disclosed. To this end the covering is characterised by the fact that the mass of synthetic resin contains a metallic structure extending parallel to the element of the heater, insulated from the element of the heater, and adapted to be electrically connected to earth.

The addition of a metallic structure connected to earth permits the element of the heater to be supplied with a current at high or medium voltage without placing the user of the heating covering in danger. In particular, the heating of a wall of a habitable building could be done directly from the electric power mains. If the covering is disposed on a roadway, it will be possible to use a supply voltage of a few hundreds of volts, permitting the length of the elements to be increased considerably, and a higher output to be attained than with a covering fed by a current at low voltage.

The invention also comprises a process of fabrication of the covering, the process comprising the steps of laying a first bed of synthetic resin, hardenable in the air, on a support, placing the element of the electric heater on the first bed of resin, covering the element of the heater by a second bed of synthetic resin, disposing the metallic structure on this second bed of resin, covering the metallic structure by a third bed of synthetic resin, and allowing the resin to harden. An additional step of connecting the metallic structure to earth should be carried out when the heating covering is installed.

Figure 1:
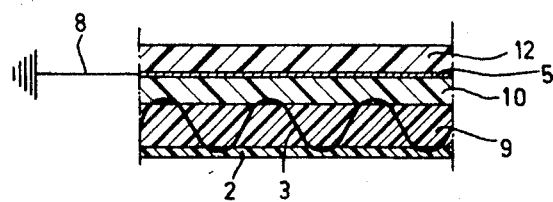
Figure 2:
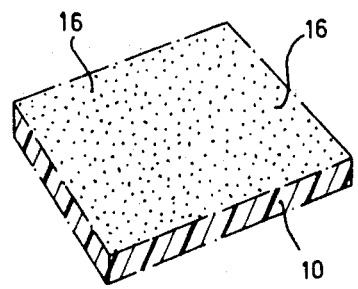

Two embodiments of the covering according to the invention, and the manner in which the process of fabrication of this covering is carried out will be described hereafter, by way of example, reference being had to the accompanying drawing wherein FIGURE 1 is a cross-section of one embodiment of a heating covering according to the invention and FIGURE 2 is a schematic perspective view of another embodiment.

According to a first embodiment, for a heating covering for a wall, first of all a layer or bed of synthetic resin is laid; this resin is soft or fluid, and can be hardened in the air by polymerization, for example, by polyaddition. As shown on FIGURE 1, this first bed of synthetic resin 2 is covered by a heating carpet 3 formed either by a fabric of glass in the drawing of which is included a heating lattice, or by disposing directly the element of the heater on the first bed of synthetic resin which acts, then, at the same time, as a thermal and electrical insulator. On the element of the heater or the heating carpet is then extended a second layer of synthetic resin hardenable in the air. Then a sheet of aluminium 5 pierced with a large number of holes so as to constitute a grill is disposed on this second bed of resin, and finally, a third bed of synthetic resin 12 is laid on the sheet of aluminium, this third bed constituting at the same time an electric insulation for the protection of the user and a protection against the shocks and other exterior agents.

As described in U.S. patent application No. 438,726, the synthetic resin can comprise two components—an enamel and a curing agent or hardener. Preferably, the enamel consists of mecamyl amide "Versamide," and the hardener is an epoxy resin.

The sheet of aluminium has, moreover, one part or connection 8 extending outside of the second (10) and third beds (12) of resin to permit its electric connection to earth.

Instead of a sheet of aluminium or of some other metal, a lattice 9 or a metallic fabric could also be used.

According to another embodiment shown partially on FIGURE 2, it is also possible to constitute this metallic structure by pulverising fine metal particles (16) on the second bed (10) of synthetic resin. This layer of particles should preferably be discontinuous so as to permit the ready adherence of the third layer of resin directly on the second by the infiltration of the resin between the particles of metal.

The hardening of the assembly is done by natural or accelerated drying, for example, by passing a low current through the element 3 of the heater.

The heating covering can be applied to a roadway or a wall, with one surface of the covering adjacent to the roadway or wall and the other opposite surface of the covering free. In the embodiments described the metallic structure is located between the heating element and the free surface.

While the invention herein has been shown in two embodiments thereof, it is obvious that structural changes may be employed without departing from the spirit of the invention and therefor the same is not limited to these precise forms beyond the limitations which may be imposed by the following claims.

What is claimed is:

1. A heating covering constructed as a unitary waffle arrangement having a first layer of synthetic resin hardened by polymerization, an electrical heating element disposed overlying substantially a whole surface of said resin layer, a second layer of said resin overlying said heating element, a foraminous metallic structure disposed overlying substantially an entire surface of said second layer of resin and spaced from said heating element and substantially parallel to the heating element, said metallic structure being electrically insulated from said heating element, means for connecting said metallic structure to ground, and a third layer of said resin over said metallic structure serving as an electrical insulation.

2. A heating covering according to claim 1, in which the metallic structure comprises a discontinuous bed of fine metal particles.

3. A heating covering according to claim 1, in which said electrical heating element comprises an electrically conductive lattice.

References Cited

UNITED STATES PATENTS

| | | | |
|---|---|---|---|
| 2,735,926 | 2/1956 | Langlois | 219—528 |
| 2,844,696 | 7/1958 | Custer | 219—345 |
| 2,845,519 | 7/1958 | Willat | 219—528 |
| 2,938,992 | 5/1960 | Crump | 338—208 X |
| 3,178,560 | 4/1965 | Mapp et al. | 219—528 |

FOREIGN PATENTS 713,684  8/1954  Great Britain.

VOLODYMYR Y. MAYEWSKY, *Primary Examiner.*

U.S. Cl. X.R.

219—213, 345, 528, 544